United States Patent

Foti

[11] Patent Number: 6,138,006
[45] Date of Patent: Oct. 24, 2000

[54] SYSTEM AND METHOD OF DELIVERING COLLECT CALLS IN A RADIO TELECOMMUNICATIONS NETWORK

[75] Inventor: George Foti, Dollard des Ormeaux, Canada

[73] Assignee: Telefonaktiebolaget L M Ericsson, Stockholm, Sweden

[21] Appl. No.: 08/937,329

[22] Filed: Sep. 20, 1997

[51] Int. Cl.[7] .................................................. H04B 1/00
[52] U.S. Cl. ........................ 455/414; 455/406; 455/466
[58] Field of Search .................................. 455/414, 406, 455/407, 428, 432, 433, 560, 561, 466; 375/157, 201, 100.04, 114, 130

[56] References Cited

U.S. PATENT DOCUMENTS

| | | | |
|---|---|---|---|
| 5,359,643 | 10/1994 | Gammino | 379/143 |
| 5,463,677 | 10/1995 | Bash et al. | 379/88 |
| 5,473,671 | 12/1995 | Partridge, III. | 379/59 |
| 5,483,581 | 1/1996 | Hird et al. | 379/132 |
| 5,504,804 | 4/1996 | Widmark et al. | 379/63 |
| 5,550,904 | 8/1996 | Andruska et al. | 379/127 |
| 5,719,927 | 2/1998 | Hariu et al. | 379/114 |
| 5,796,790 | 8/1998 | Brunner | 455/406 |
| 5,963,869 | 10/1999 | Fehnel | 455/511 |
| 6,005,927 | 12/1999 | Rahrer et al. | 379/142 |

FOREIGN PATENT DOCUMENTS

| | | |
|---|---|---|
| 0 587 259 A2 | 3/1994 | European Pat. Off. . |
| 5-268650 | 10/1993 | Japan ............... H04Q 3/545 |
| 2 294 611 | 5/1996 | United Kingdom ............. H04Q 7/22 |
| 99 16265 | 4/1999 | WIPO ............... H04Q 7/22 |

*Primary Examiner*—Nguyen Vo
*Assistant Examiner*—Makoto Aoki
*Attorney, Agent, or Firm*—Smith & Danamraj, P. C.

[57] ABSTRACT

In a radio telecommunications network, a system and method of informing a called mobile station operating in a visited mobile switching center (V-MSC) that an incoming call is a collect call prior to delivering the incoming call to the mobile station. The system obtains in an originating mobile switching center (O-MSC), a collect call prefix from a calling party and determines from the collect call prefix that the incoming call is a collect call. A collect call indication (CCI) is generated and sent along with the calling number to the V-MSC in a Location Request (LocReq) Invoke message and a Routing Request (RoutReq) Invoke message, thereby notifying the V-MSC that there is an incoming call for the mobile station and the incoming call is a collect call. The V-MSC sets a collect call flag to ON, stores the calling number in a subscriber record in the V-MSC, and determines whether the mobile station is a digital mobile station. If so, a Short Message Service (SMS) message including the calling number is sent to the mobile station informing the subscriber that the incoming call is about to be delivered and the incoming call is a collect call. If the mobile station is a dual-capable mobile station, a distinctive ringing signal is sent to the mobile station. The incoming call is then delivered to the mobile station, and the subscriber may choose to answer or not. The collect call flag is then reset to OFF in the subscriber record in the V-MSC.

19 Claims, 2 Drawing Sheets

6,138,006

SYSTEM AND METHOD OF DELIVERING COLLECT CALLS IN A RADIO TELECOMMUNICATIONS NETWORK

BACKGROUND OF THE INVENTION

1. Technical Field of the Invention

This invention relates to radio telecommunication systems and, more particularly, to a system and method of delivering collect calls in a radio telecommunications network.

2, Description of Related Art

In existing radio telecommunications networks, there is no method of placing collect calls from a calling mobile station to a called mobile station. To implement collect calls in a radio telecommunications network, the called party must be informed through manual operator intervention that the call is a collect call before he accepts the call.

Although there are no known prior art teachings of a solution to the aforementioned deficiency and shortcoming such as that disclosed herein, U.S. Pat. No. 5,473,671 to Partridge, III (Partridge); U.S. Pat. No. 5,483,581 to Hird et al. (Hird); U.S. Pat. No. 5,463,677 to Bash et al. (Bash); and U.S. Pat. No. 5,550,904 to Andruska et al. (Andruska) discuss subject matter that bears some relation to matters discussed herein. Partridge discloses a cellular telephone system in which a list of accepted callers is maintained. Calls from accepted callers are forwarded to the called mobile telephone. Otherwise, the caller is offered the option to pay for the call. If the caller accepts by pressing a designated key on his telephone, the call is connected.

Partridge therefore discloses a system which provides to a selected number of calling parties, the option of paying for a call to a mobile telephone. Partridge, however, does not teach or suggest a method of placing a collect call to a mobile station or a method of informing the called mobile station that the incoming call is a collect call.

Hird discloses a method and apparatus for performing an automated collect call in a wireline telephone system without the need for a live operator. The apparatus includes a microprocessor control system, a speech generator, and a speech memory. The calling party enters his name and the called party's number, and the apparatus calls the number and determines whether the called party accepts the charges for the collect call. If so, the call is connected.

Hird, however, is applicable only to wireline networks, and does not teach or suggest a method of placing a collect call to a mobile station or a method of informing the called mobile station that the incoming call is a collect call.

Bash discloses a method and apparatus for facilitating the making of collect calls in a wireline telephone network. If a caller making a collect call encounters a busy signal or no answer, he can store a voice mail message in a messaging system. The messaging system then periodically attempts to deliver the stored message. When the called party answers, the system asks if he will accept the charges for a collect voice message. If so, the stored message is played. Otherwise, the message is not delivered.

Bash, however, is applicable only to wireline networks, and does not teach or suggest a method of placing a collect call to a mobile station or a method of informing the called mobile station that the incoming call is a collect call.

Andruska discloses a method for identifying an originating network at a terminating network for transnetwork wireline calls. An originating network identifier (ONI) is transmitted in an initial address message (IAM), and is used in the terminating network to screen the call for special treatment such as denied termination for collect calls.

Andruska, however, is applicable only to wireline networks, and does not teach or suggest a method of placing a collect call to a mobile station or a method of informing the called mobile station that the incoming call is a collect call.

Review of each of the foregoing references reveals no disclosure or suggestion of a system or method such as that described and claimed herein.

In order to overcome the disadvantage of existing solutions, it would be advantageous to have a system and method of placing a collect call to a mobile station and informing the called mobile station that the incoming call is a collect call. The present invention provides such a system and method.

SUMMARY OF THE INVENTION

In one aspect, the present invention is a method in a radio telecommunications network of informing a called mobile station operating in a visited mobile switching center (V-MSC) that an incoming call is a collect call prior to delivering the incoming call to the mobile station. The method begins by determining in an originating mobile switching center (O-MSC) that the incoming call is a collect call, and notifying the V-MSC that there is an incoming call for the mobile station and the incoming call is a collect call. This is followed by sending an indication to the mobile station that the incoming call is about to be delivered and the incoming call is a collect call, and delivering the incoming call to the mobile station. The method may also include the steps of determining whether the mobile station is a digital mobile station, and if so, sending a Short Message Service (SMS) message to the mobile station prior to call delivery, informing the subscriber that the incoming call is a collect call. If the mobile station is a dual-capable mobile station which is capable of analog operation, the method may include delivering the call with a distinctive ringing signal to the mobile station, informing the subscriber that the incoming call is a collect call.

In another aspect, the present invention is a system in a radio telecommunications network for informing a called mobile station operating in a visited mobile switching center (V-MSC) that an incoming call is a collect call prior to delivering the incoming call to the mobile station. The system includes an originating mobile switching center (O-MSC) which includes means for determining that the incoming call is a collect call, and means for notifying the V-MSC that there is an incoming call for the mobile station and the incoming call is a collect call. The system also includes means for sending an indication to the mobile station that the incoming call is about to be delivered and the incoming call is a collect call, and means for delivering the incoming call to the mobile station.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
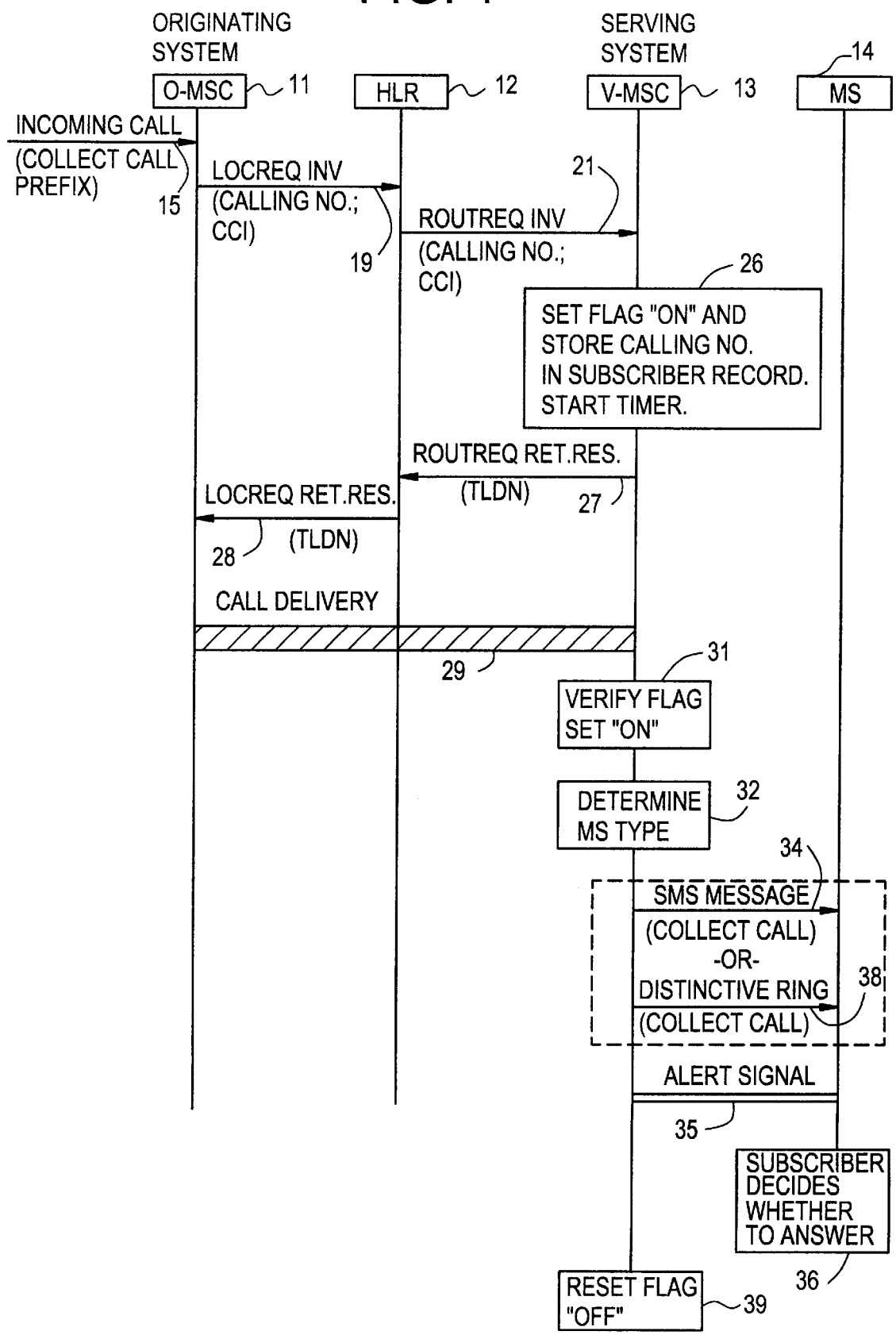
FIG. 1 is a message flow diagram illustrating the flow of messages between the nodes of a radio telecommunications network in which the present invention has been implemented.

FIG. 1 is a message flow diagram illustrating the flow of messages between the nodes of a radio telecommunications network in which the present invention has been implemented. The nodes of the network include an originating mobile switching center (O-MSC) 11, a home location register (HLR) 12, a visited mobile switching center (V-MSC) 13, and a called mobile station (MS) 14.

Figure 2:
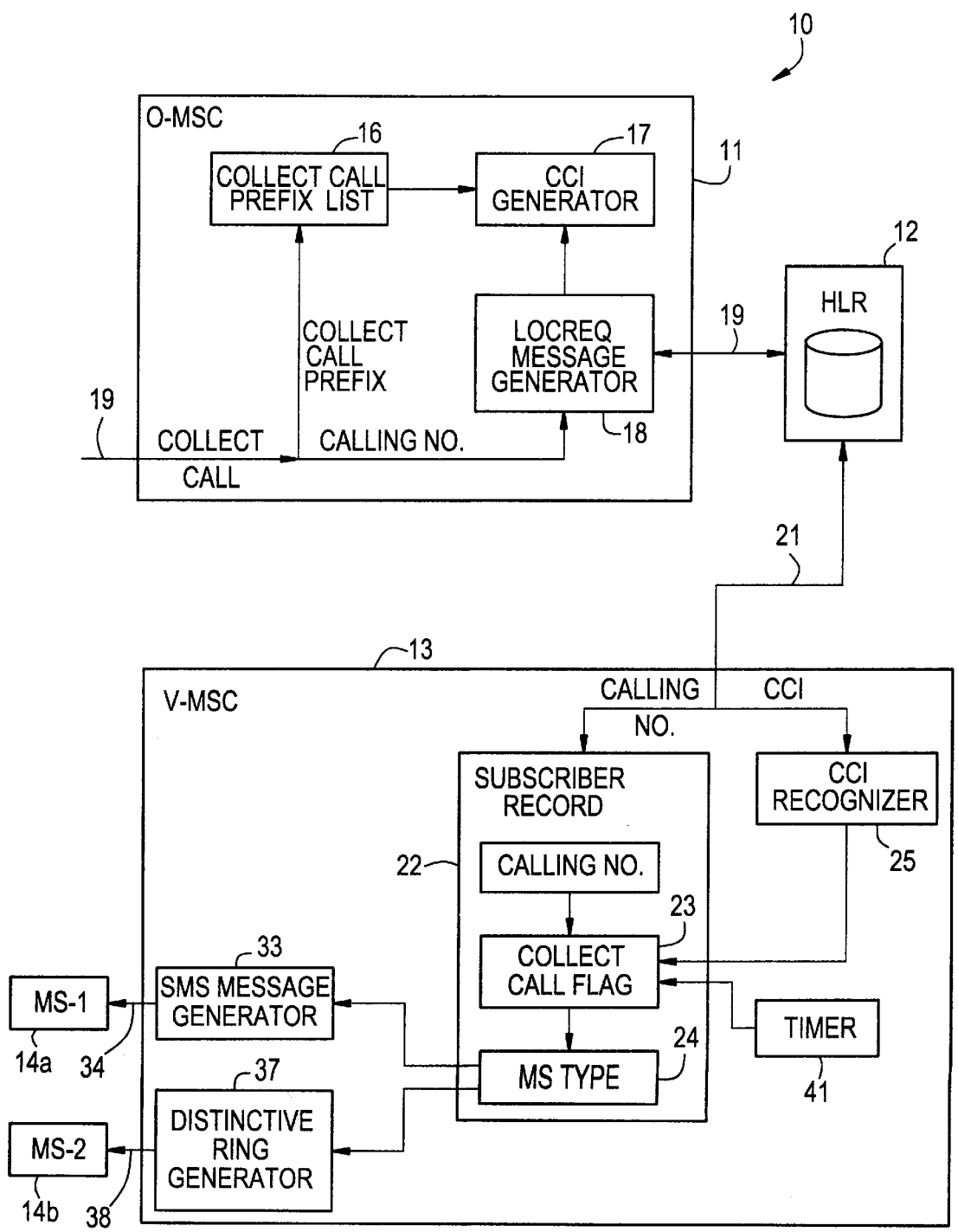
FIG. 2 is a simplified block diagram of the nodes of the telecommunications network 10 in which the present invention has been implemented.

FIG. 2 is a simplified block diagram of the nodes of the telecommunications network 10 in which the present invention has been implemented. It is understood that there are other nodes in the network, however for simplicity, only those nodes affected by the implementation of the present invention are shown. With continuing reference to FIGS. 1 and 2, the present invention will now be described.

When a calling party desires to place a collect call 15 to the mobile station 14, the calling party dials a collect call prefix prior to dialing the called telephone number. The O-MSC 11 detects that the calling party has dialed a collect call prefix by, for example, comparing the dialed prefix with a collect call prefix list 16. A collect call indicator (CCI) generator 17 then generates a CCI which a Location Request (LocReq) message generator 18 then places into a LocReq Invoke message 19 along with the calling number. The LocReq Invoke message is sent to the HLR 12 which forwards the information in a Routing Request (RoutReq) Invoke message 21 to the V-MSC 13.

The V-MSC 13 utilizes the calling number and the CCI in the RoutReq Invoke message to populate a collect call field in the V-MSC's subscriber record 22 for the called mobile station 14. The field includes a collect call flag 23 and the calling number. The subscriber record may also include, among other things, an indication of the mobile station type 24 of the called mobile station (i.e., digital or dual-capable). A CCI recognizer 25 in the V-MSC recognizes the CCI, sets the collect call flag 23 to "ON", and stores the calling number in the subscriber record at step 26 of FIG. 1. A timer 41 is started in the V-MSC which resets the collect call flag to "OFF" if the incoming call is not delivered to the V-MSC within a predetermined time period. The V-MSC then follows normal call setup procedures and sends a RoutReq Return Result message 27 to the HLR 12 and includes a routing number such as a Temporary Location Directory Number (TLDN). The HLR sends a LocReq Return Result message 28 to the O-MSC 11 and includes the TLDN. A trunk is then seized between the O-MSC and the V-MSC to deliver the call at 29.

When the call is delivered to the V-MSC 13, the V-MSC verifies that the collect call flag 23 is set to ON at step 31. If the flag is ON, the V-MSC determines the MS type 24 at step 32. If the called mobile station is a digital mobile station (MS-1) 14a, a Short Message Service (SMS) message generator 33 sends a SMS data message 34 over the digital control channel (DCCH) to the MS-1 informing the subscriber that an incoming collect call is about to be delivered. The SMS message also includes the calling number from the subscriber record. This is followed by sending an alerting (ringing) signal 35 to the MS-1. At step 36, the informed subscriber may chose whether or not to answer the call.

If the called mobile station is a dual-capable mobile station (MS-2) 14b which is capable of analog operation, a distinctive ring generator 37 may generate a distinctive ring or specific tones 38 on the air interface to indicate that the call is a collect call.

At step 39, following call delivery to the MS 14, the collect call flag 23 is reset to "OFF" in the temporary subscriber record 22. In addition, if for any reason the call cannot be delivered to the V-MSC, the timer 41 ensures that the collect call flag 23 is reset to OFF after a predetermined time period.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network, a method of informing a called mobile station operating in a visited mobile switching center (V-MSC) that an incoming call is a collect call prior to delivering the incoming call to the mobile station, said method comprising the steps of:
   determining in an originating mobile switching center (0-MSC) that the incoming call is a collect call;
   notifying the V-MSC that there is an incoming call for the mobile station, and the incoming call is a collect call, by:
      generating a collect call indication (CCI) in said 0-MSC:
      including the CCI and a calling number in a Location Request (LocReq) Invoke message from said 0-MSC to a home location register (HLR); and
      including the CCI and the calling number in a Routing Request (RoutReq) Invoke message from said HLR to said V-MSC,
   determining the mobile station type;
   sending an indication according to the mobile station type to the mobile station that the incoming call is about to be delivered, and the incoming call is a collect call; and
   delivering the incoming call to the mobile station.

2. The method of claim 1 wherein said step of determining in an O-MSC that the incoming call is a collect call includes the steps of:
   obtaining a collect call prefix from a calling party; and
   determining from the collect call prefix that the incoming call is a collect call.

3. The method of claim 1 wherein said step of determining the mobile station type includes determining whether said mobile station is a digital mobile station or a dual capable mobile station.

4. The method of claim 3 wherein said step of sending an indication to the mobile station that the incoming call is about to be delivered and the incoming call is a collect call, includes sending a data message to the mobile station upon determining that the mobile station is a digital mobile station.

5. The method of claim 4 wherein said step of sending a data message to the mobile station includes sending a Short Message Service (SMS) message which includes a calling number and an indication that the incoming call is a collect call, to the mobile station prior to delivering the incoming call to the mobile station.

6. The method of claim 3 wherein said step of sending an indication to the mobile station that the incoming call is about to be delivered and the incoming call is a collect call, includes sending a distinctive ringing signal to said mobile station upon determining that the mobile station is a dual capable mobile station.

7. The method of claim 1 further comprising, after the step of notifying the V-MSC that there is an incoming call for the mobile station and the incoming call is a collect call, the steps of:

setting a collect call flag to ON in a subscriber record in said V-MSC; and storing the calling number in the subscriber record.

8. The method of claim 7 further comprising the step of resetting the collect call flag to OFF in the subscriber record in said V-MSC after delivering the incoming call to the mobile station.

9. The method of claim 7 further comprising the step of resetting the collect call flag to OFF in the subscriber record in said V-MSC if a timer expires before delivering the incoming call to the mobile station.

10. In a radio telecommunications network, a method of informing a called mobile station operating in a visited mobile switching center (V-MSC) that an incoming call is a collect call prior to delivering the incoming call to the mobile station, said method comprising the steps of:

obtaining in an originating mobile switching center (O-MSC), a collect call prefix from a calling party;

determining from the collect call prefix that the incoming call is a collect call;

including a collect call indication (CCI) and a calling number in a Location Request (LocReq) Invoke message from said O-MSC to a home location register (HLR);

including the CCI and the calling number in a Routing Request (RoutReq) Invoke message from said HLR to said V-MSC, thereby notifying the V-MSC that there is an incoming call for the mobile station and the incoming call is a collect call;

setting a collect call flag to ON and storing the calling number in a subscriber record in said V-MSC;

starting a timer in the V-MSC, said timer resetting said collect call flag to OFF if the incoming call is not delivered to the V-MSC within a predetermined time period;

determining whether said mobile station is a digital mobile station or a dual capable mobile station;

sending a Short Message Service (SMS) message from the V-MSC to the mobile station upon determining that the mobile station is a digital mobile station, said SMS message including the calling number and indicating that the incoming call is about to be delivered and the incoming call is a collect call;

sending a distinctive ringing signal to the mobile station upon determining that the mobile station is a dual capable mobile station;

delivering the incoming call to the mobile station; and resetting the collect call flag to OFF in the subscriber record in said V-MSC.

11. A system in a radio telecommunications network for informing a called mobile station operating in a visited mobile switching center (V-MSC) that an incoming call is a collect call prior to delivering the incoming call to the mobile station, said system comprising:

an originating mobile switching center (0-MSC), said 0-MSC including means for determining that the incoming call is a collect call;

means for notifying the V-MSC that there is an incoming call for the mobile station and the incoming call is a collect call wherein said means for notifying the V-MSC comprises:

a collect call indication (CCI) generator in said 0-MSC:

means for including the CCI and a calling number in a Location Request (LocReq) Invoke message from said 0-MSC to a home location register (HLR); and means for including the CCI and the calling number in a Routing Request (RoutReq) Invoke message from said HLR to said V-MSC;

means for determining the mobile station type;

means for sending an indication according to the mobile station type to the mobile station that the incoming call is about to be delivered and the incoming call is a collect call; and means for delivering the incoming call to the mobile station.

12. The system of claim 11 wherein said means for determining in the O-MSC that the incoming call is a collect call includes:

means for obtaining a collect call prefix from a calling party; and means for determining from the collect call prefix that the incoming call is a collect call.

13. The system of claim 11 wherein said means for determining the mobile station type includes means for determining whether said mobile station is a digital mobile station or a dual-capable mobile station.

14. The system of claim 13 wherein said means for sending an indication to the mobile station that the incoming call is about to be delivered and the incoming call is a collect call, includes a Short Message Service (SMS) message generator that sends a Short Message Service (SMS) message including a calling number to the mobile station upon determining that said mobile station is a digital mobile station, and prior to delivering the incoming call to the mobile station.

15. The system of claim 13 wherein said means for sending an indication to the mobile station that the incoming call is about to be delivered and the incoming call is a collect call, includes a distinctive ring generator that sends a distinctive ringing signal to said mobile station upon determining that the mobile station is a dual-capable mobile station, and prior to delivering the incoming call to the mobile station.

16. The system of claim 11 further comprising means for setting a collect call flag to ON and storing a calling number in a subscriber record in said V-MSC upon receipt of said CCI.

17. The system of claim 16 further comprising means for resetting the collect call flag to OFF in the subscriber record in said V-MSC after delivering the incoming call to the mobile station.

18. The system of claim 16 further comprising a timer in said V-MSC for resetting the collect call flag to OFF in the subscriber record if the timer expires before delivering the incoming call to the mobile station.

19. A system in a radio telecommunications network for informing a called mobile station operating in a visited mobile switching center (V-MSC) that an incoming call is a collect call prior to delivering the incoming call to the mobile station, said system comprising:

an originating mobile switching center (O-MSC), said O-MSC including:

means for determining that the incoming call is a collect call, said collect call determining means including:

means for obtaining a collect call prefix from a calling party; and means for determining from the collect call prefix that the incoming call is a collect call;

means for notifying the V-MSC that there is an incoming call for the mobile station and the incoming call is a collect call, said notifying means including:

a collect call indication (CCI) generator in said O-MSC;

means for including the CCI and a calling number in a Location Request (LocReq) Invoke message from said O-MSC to a home location register (HLR); and means for including the CCI and the calling number in a Routing Request (RoutReq) Invoke message from said HLR to said V-MSC;

means for setting a collect call flag to ON and storing the calling number in a subscriber record in said V-MSC upon receipt of said CCI;

means for determining whether said mobile station is a digital mobile station;

a Short Message Service (SMS) message generator that sends a Short Message Service (SMS) message to the mobile station upon determining that said mobile station is a digital mobile station, and prior to delivering the incoming call to the mobile station, said SMS message indicating that the incoming call is a collect call and including the calling number;

a distinctive ring generator that sends a distinctive ringing signal to said mobile station upon determining that the mobile station is a dual-capable mobile station, and prior to delivering the incoming call to the mobile station;

means for delivering the incoming call to the mobile station; and means for resetting the collect call flag to OFF in the subscriber record in said V-MSC.

* * * * *